Nov. 7, 1933.  F. P. FRANKFORD  1,933,725

TURNSTILE

Filed Oct. 26, 1931   8 Sheets-Sheet 1

INVENTOR
Frank P. Frankford
BY
ATTORNEYS

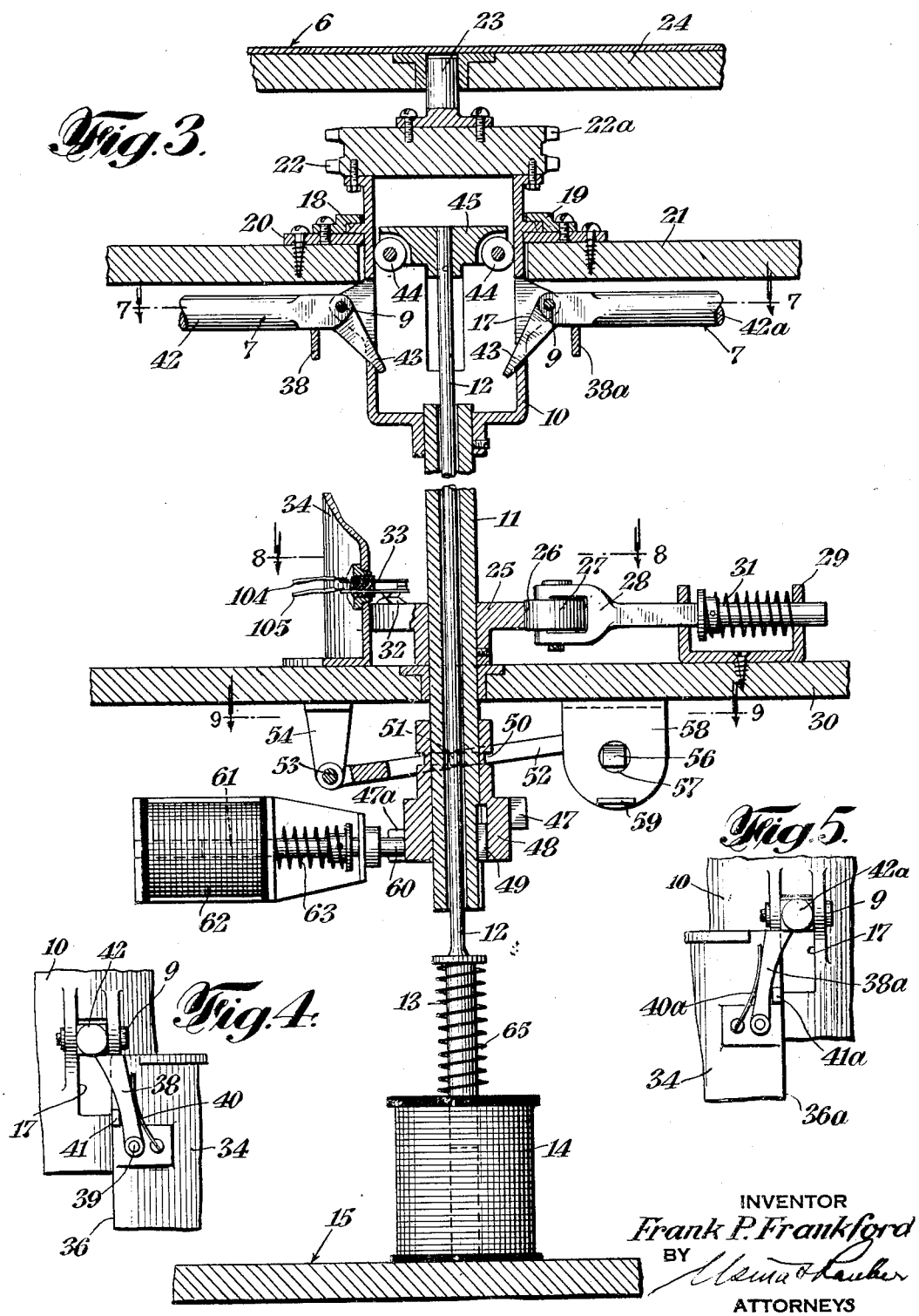

Nov. 7, 1933.  F. P. FRANKFORD  1,933,725
TURNSTILE
Filed Oct. 26, 1931  8 Sheets-Sheet 3
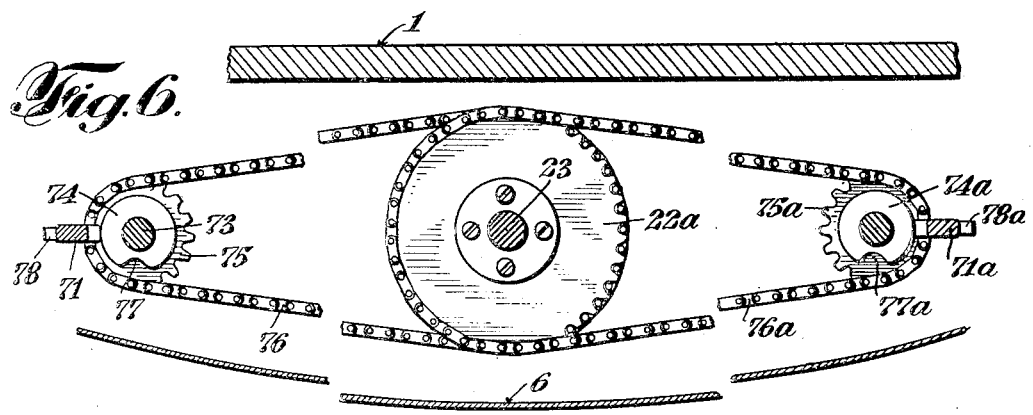
Fig. 6.
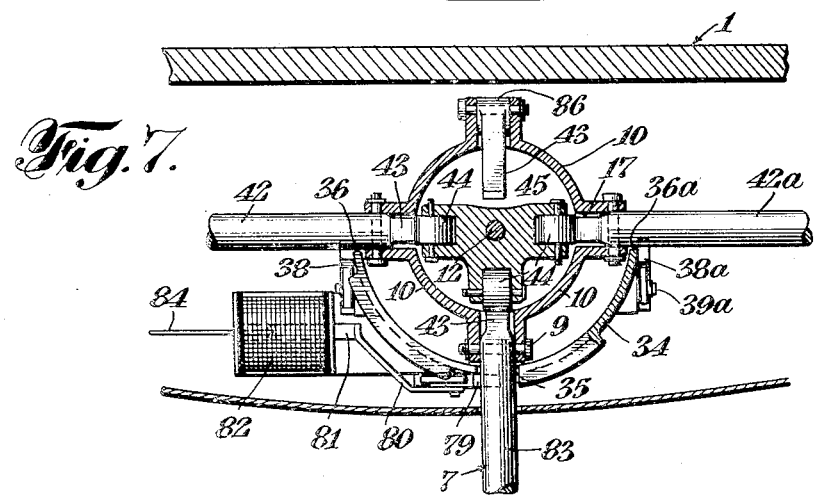
Fig. 7.
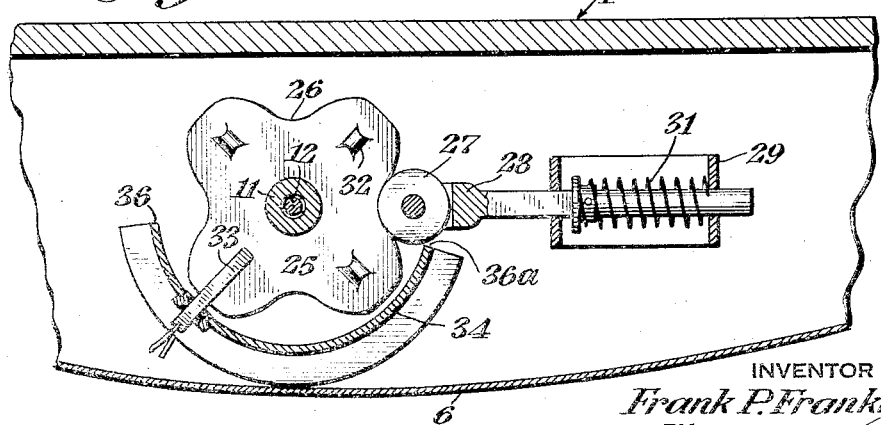
Fig. 8.
INVENTOR
Frank P. Frankford
BY
ATTORNEYS Nov. 7, 1933.  F. P. FRANKFORD  1,933,725
TURNSTILE
Filed Oct. 26, 1931  8 Sheets-Sheet 4
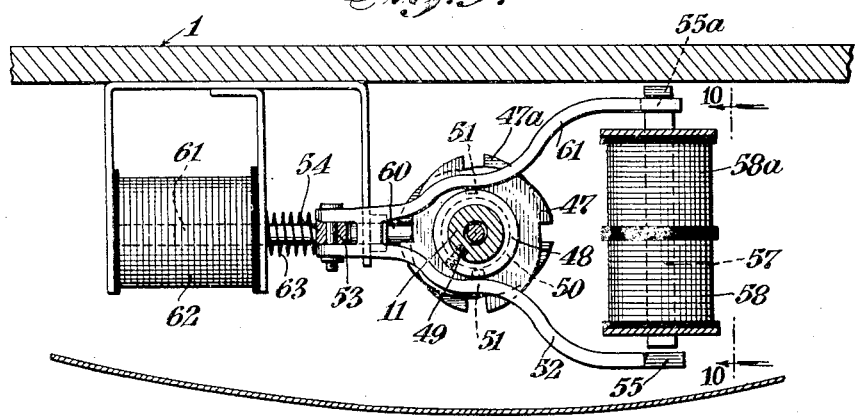
Fig. 9.
Fig. 10.
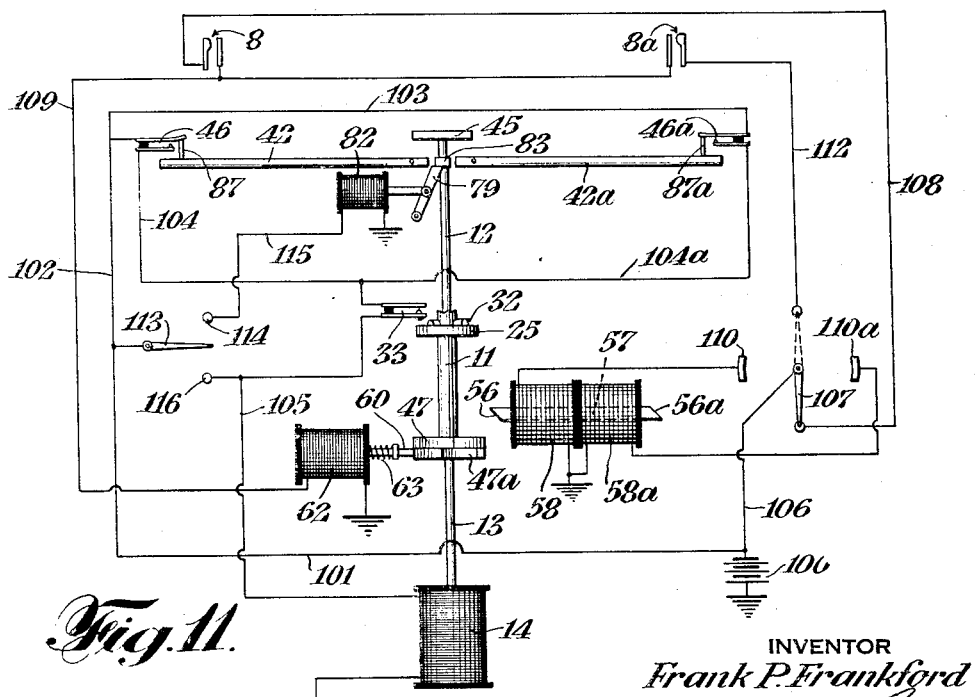
Fig. 11.
INVENTOR
Frank P. Frankford
BY
ATTORNEYS Nov. 7, 1933.　　　　F. P. FRANKFORD　　　　1,933,725
TURNSTILE
Filed Oct. 26, 1931　　　8 Sheets-Sheet 5

INVENTOR
Frank P. Frankford
BY
ATTORNEYS

Nov. 7, 1933.    F. P. FRANKFORD    1,933,725
TURNSTILE
Filed Oct. 26, 1931    8 Sheets-Sheet 6
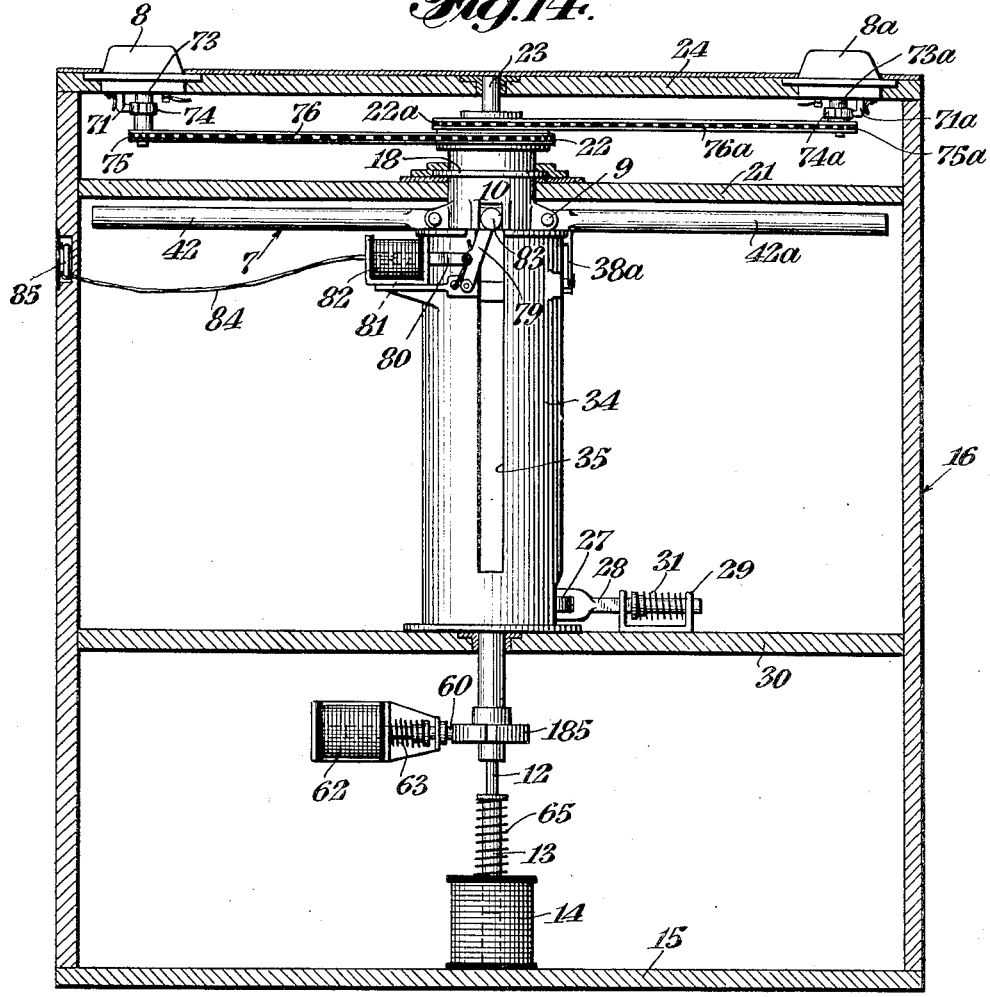
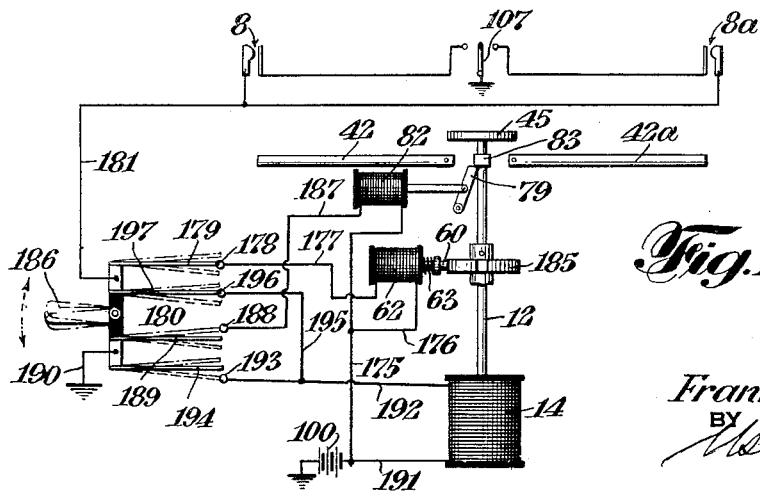
INVENTOR
Frank P. Frankford
BY
ATTORNEYS

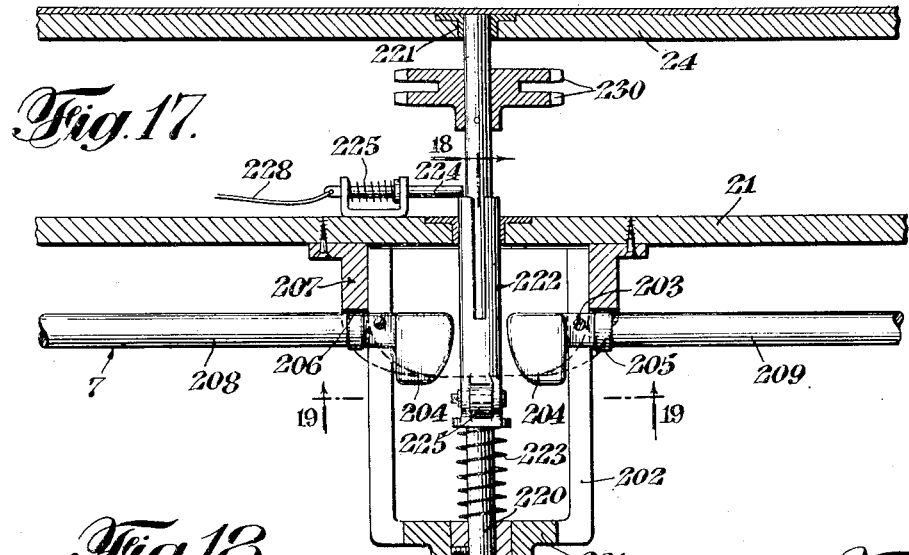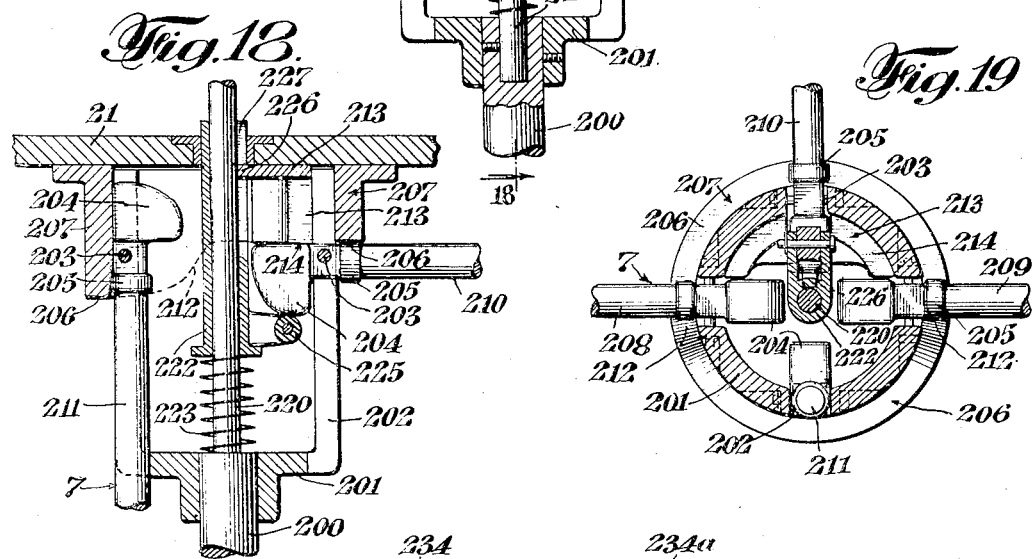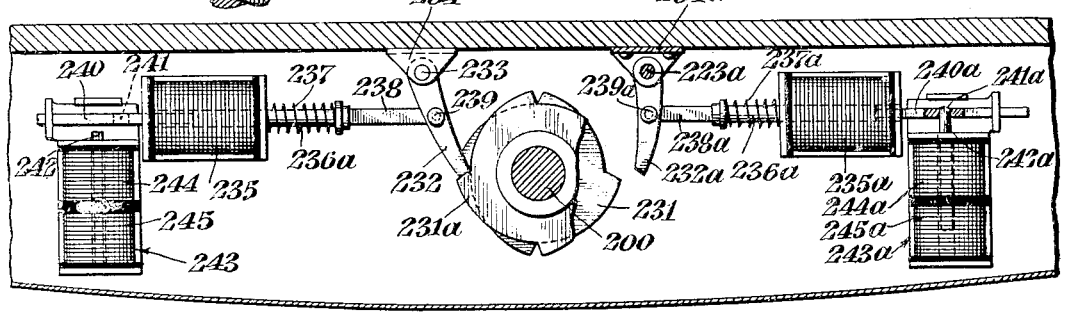

Nov. 7, 1933.  F. P. FRANKFORD  1,933,725
TURNSTILE
Filed Oct. 26, 1931  8 Sheets-Sheet 8

INVENTOR
Frank P. Frankford
BY
ATTORNEYS

Patented Nov. 7, 1933

1,933,725

UNITED STATES PATENT OFFICE 1,933,725

TURNSTILE

Frank P. Frankford, Ridgefield Park, N. J.

Application October 26, 1931. Serial No. 571,030

7 Claims. (Cl. 39—3)

This invention relates to turnstiles and more particularly to turnstiles adapted to be utilized on buses and the like where the space in which they are mounted is limited.

One of the objects of the present invention is to provide a turnstile which is adapted to be reversed in its operation with respect to incoming and outgoing passengers, permitting free operation in one direction, toll operation in the other and vice versa.

Another object is to provide a turnstile device in which all the arms do not extend horizontally at one time and in which one or more of the arms may be vertically dropped in succession thereby providing a turnstile device requiring about one-half the usual mounting space adapted to be positioned adjacent a wall.

Other objects and advantages will become apparent as the invention is more fully disclosed.

In accordance with the objects of the present invention I have devised a turnstile device which is adapted to be constructed in several modified forms.

In the accompanying drawings I have shown several modifications of the present invention. One modification is adapted to be operated by electrical means and a second modification is adapted to be operated by compressed air. The turnstile functioning of the two modifications are substantially the same. A third modification provides means to admit passengers by a rotation of the turnstile as in the first modification and also provides emergency means to drop the turnstile arm projecting in the path of the passenger when desired which means is operable by the bus operator or passengers.

Before further disclosing the nature and scope of the present invention reference should be had to the accompanying drawings, wherein—

Fig. 3 is a fragmentary vertical detail section of the parts shown in Fig. 2.

Fig. 4 is a fragmentary view looking in the direction of arrow 4, Fig. 3.

Fig. 5 is a fragmentary view looking in the direction of arrow 5, Fig. 3.

Fig. 6 is a horizontal section taken on the line 6—6 of Fig. 2.

Fig. 7 is a section taken on the line 7—7 of Fig. 3.

Fig. 8 is a section taken on the line 8—8 of Fig. 3.

Fig. 9 is a section taken on the line 9—9 of Fig. 3.

Fig. 10 is a detailed section on the line 10—10 of Fig. 9.

Fig. 11 is an electrical diagrammatic circuit of the preferred form of my invention.

Fig. 14 is a modification of a view similar to Fig. 2.

Fig. 15 is an electrical diagram of the form shown in Fig. 14.

Fig. 17 is a fragmentary vertical section of parts shown in Fig. 16 in detail.

Fig. 18 is a section taken on line 18—18 of Fig. 17.

Fig. 19 is a section taken on line 19—19 of Fig. 17.

Fig. 20 is a section taken on line 20—20 of Fig. 16.

Figure 1:
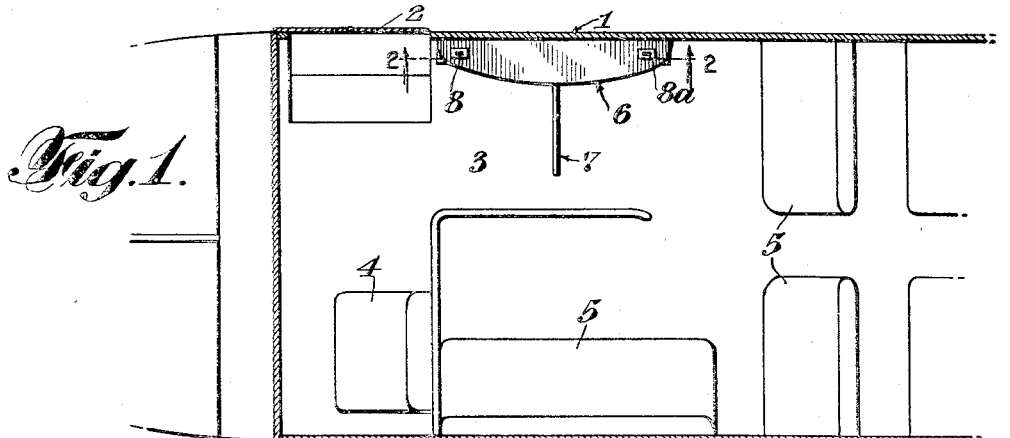
Fig. 1 is a simplified plan view of a portion of the bus.

Referring to the drawings the first modification of the present invention is illustrated in Figs. 1 to 11. In Fig. 1, 1 designates the bus having an entrance door 2, a passage-way 3, a driver's seat 4 and passengers' seats 5. The turnstile is generally indicated at 6, having arms 7 which successively horizontally extend into the passageway 3 as the turnstile is operated. Each arm is also successively permitted to drop down and hang vertically as it reaches the position opposite the passage-way. This turnstile shown in Fig. 1 is placed against one side of the bus. Coin slots 8 and 8a at each end of the turnstile are provided to receive the fares and operate suitable mechanism to permit the turning of the arms 7. The mechanism is so arranged that only one coin slot is effective at any one time.

In buses that travel in zones, fare is sometimes collected from passengers entering the buses in one zone and collected from passengers leaving the buses in another. For example, a bus traverses zones I and II. In zone I, incoming passengers must pay fare in order to operate the turnstile, and outgoing passengers are afforded free passage therethrough. The incoming passengers, therefore, cannot turn the turnstile unless a coin is deposited, but the outgoing passengers may do so freely. In zone II, this condition is reversed and the incoming passengers go through the turnstile freely, while the outgoing passengers must deposit fare in order to operate the turnstile. This will hereafter be described as "fare in" and "fare out", it being understood that "fare in" includes free exit and "fare out" includes free entrance to or from the bus. The change over from "fare in" to "fare out" is under the control of the operator of the bus.

The arms 7, Fig. 3, are pivotally mounted as at 9 to a casting 10 which is fixed to a rotatable sleeve 11 which surrounds a rod 12 connected to a core 13 of a solenoid 14, said solenoid being mounted on the bottom cross bar 15 of a frame 16. The casting 10 is provided with slots 17 to permit the arms 7 to pass therein and is also provided with an angular flange 18 surrounded by annulus 19 which is secured to a plate 20 securely fastened to a cross bar 21 of the frame 16. This permits the rotation of the casting 10 within the members 19 and 20. Secured to the upper portion of the casting 10 are two sprockets 22 and 22a which carry a pintle 23 rotatably mounted in the upper cross bar 24 of the frame 16.

A cam 25, Figs. 3 and 8, having recesses 26 which cooperate with a spring pressed roller 27 to retain the arms in quadrangular position with respect to the passage-way 3 at all times, and to assist in the completion of each movement of the extending turnstile arm, is secured to the sleeve 11. The roller 27 is held in the fork 28 slidably arranged in a bracket 29 which is secured to the cross bar 30 of the frame 16. A spring 31 urges the roller 27 into contact with the cam 25.

Projections 32 on the upper face of the cam 25 are arranged to close contact of a switch 33 at the completion of every quarter turn of the turnstile. The function of this contact will be hereinafter fully explained. Secured to the cross bar 30 and partly surrounding the sleeve 11 is a support 34 having a slot 35 at the front portion thereof and terminating at edges 36 and 36a. The upper edges of this support 34 assists in keeping the turnstile arms horizontal during their travel from one right angle position to the next in either direction. In order to maintain the turnstile arms in a horizontal position during the normal or idle position of the turnstile, dogs 38 and 38a are pivoted to the member 34 at 39 and 39a as shown in Figs. 4 and 5. Springs 40 and 40a urge the dogs against the stops 41 and 41a. When the dogs 38 and 38a are against these stops 41 and 41a the upper ends of said dogs extend beyond the edges 36 and 36a of the casting of 34 thereby supporting two of the three extending arms 7 indicated as at 42 and 42a which lie within the frame 25.

Extensions 43 of the arms 7 protrude inwardly of the pivots 9 and lie within the slots 17 are engageable by rollers 44 carried by a head 45 secured to the rod 12. It will be seen that if any of the arms 7 are down the energization of the solenoid 14 will raise the arms 7 to a horizontal position and be retained in this position by the dogs 38 and 38a.

Spring contacts 46 and 46a are mounted on the cross bar 21 and are arranged to remain open when the arms 42 and 42a are in a horizontal position. The contacts close when the arms are moved from thereunder. The solenoid 14 is operated by contacts 33 only when either of the contacts 46 and 46a are closed. That is, the turnstile must be in normal position and one of the arms down. The contacts will be more clearly described hereafter.

In the operation of the turnstile device of the present invention it will be seen from Fig. 7 that in the normal position of the turnstile three of the four arms are retained in a horizontal position; the front arm by the dog 38, the rear arm by the dog 38a and the passage arm by the dog 79. The wall arm 86 is always down, there being no support provided therefore. Means are provided however so that if the turnstile is moved slightly in any direction the front or rear arms 42 and 42a respectively will drop. The direction of rotation, of course, determines which of the arms will drop.

Assuming that a person wishes to pass through the turnstile in a free direction, that is, the ratchets being in such position favoring this direction as indicated by the full line, the arrow in Fig. 7 which in this instance is "fare out", the contact 33 will be open soon after the turnstile is advanced slightly. Upon further movement of the turnstile arm 83 clockwise, the contacts 46 and 46a are closed by the dropping of the pins 87 and 87a, the arms having passed from thereunder.

During the first movement of the turnstile the cam 25 will push against the roller 27 and its spring 31 until the turnstile is turned about 45° whereafter the spring 31 will force roller 27 to ride down the succeeding groove of the cam and cause the turnstile to complete one quadrant of rotation. When the quarter is completed the contact 33 is again made. The contact 46 is opened by the arm that was previously in the passage-way, while the contact 46a remains closed due to the wall arm having turned one quadrant and still in the vertical position.

Having completed the quadrant turn, means are provided to return the arm to a horizontal position. Referring to Fig. 11, the specific means herein provided comprises an electrical means. In the electrical circuit shown in Fig. 11, current will flow from a battery 100 through wires 101, 102 and 103 to the contact 46a through wire 104a contacts 33 which is closed by the projections 32 being in the normal position, through wires 105 and solenoid 14, thereby causing the solenoid to operate which raises the previous wall arm now in the rear arm position. The previous front arm automatically drops down and assumes the wall arm position. The energization of the solenoid 14 causes the rear arm (formerly the wall arm) to be raised and in so doing it breaks the solenoid circuit at 46a, permitting the solenoid core to return to its normal raised position by a spring 65. The arm, however, is retained in the horizontal position by the dog 38a.

The reversible "fare in" or "fare out" means comprises a pair of ratchets 47 and 47a, Figs. 3 and 9, opposite to each other which are integrally formed on a sliding member 48. This sliding ratchet member 48 is keyed as at 49 to the sleeve 11 and rotates together with the turning of the turnstile arms. An annular groove 50 receives a pin 51 extending from a fork 52 which is pivoted as at 53 on bracket 54 extending from beneath the cross bar 30. The open end of the fork 52 comprises cam faces 55 and 55a which are engageable by the cam faces 56 and 56a of a lazy core 57 lying within a pair of solenoids 58 and 58a (Fig. 10) and are so arranged that when the solenoid 58 is energized the core 57 will move to the left as shown. The cam faces 55 and 56 will meet and upon a further movement of the core 57 the open end of the fork 52 will be moved downward thereby causing the ratchet member 48 to slide downward. A stop 59 is provided to define the position of ratchet 47.

Conversely, when the solenoid 58a is energized the core 57 will move to the right and raise the fork and ratchet 48 due to the inclined faces 55a and 56a. In this way the member 48 may be caused to be engaged by a locking bolt 60 connected to the core 61 of solenoid 62 which is constantly urged into locking position against the member 48 by a spring 63. The locking bolt 60 is round cross-section and the ratchets 47 and 47a are inversely spaced apart as shown in Fig. 9 to permit the easy accommodation of the bolt from the ratchet 47 to the ratchet 47a and vice versa.

Figure 2:
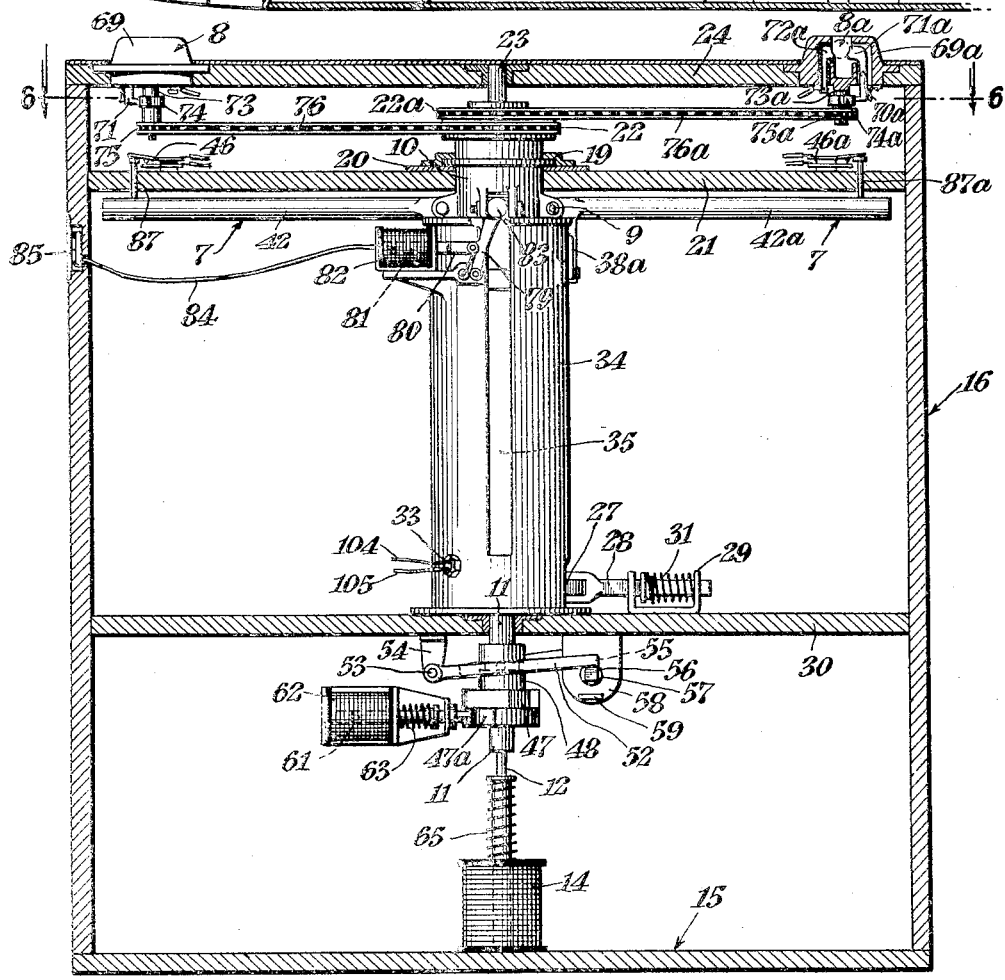
Fig. 2 is a vertical cross-section substantially on the line 2—2, Fig. 1.

The coin operating means of the present invention is illustrated in Fig. 2 wherein is shown the specific means devised to receive the coin and to release it at the proper time. Two coin casings 69 and 69a (Fig. 2) are provided which are secured to the cross bar 24 at each end of the turnstile. These casings are provided with the coin slots 8 and 8a. Pivoted as at 70a, is a pivoted coin retainer member 71a which extends into the path of a coin, thereby causing electrical contact to be made between it and the member 72a. The casing 69a forms the ground of an electric circuit which is completed by a coin and the member 72a. The member 72a is suitably insulated from the casing 69. A stud 73a carries a rotatable cam 74a secured to a sprocket 75a which is driven through chain 76a by the sprocket 22a. The cam 74a, Fig. 6, has a depression 77a which is adapted to receive the lower end of the pivoted member 71a. When the turnstile is turned the cam groove 77a is so positioned that after sufficient movement of the turnstile, the lower end of member 71a is urged by a spring 78a into the recess 77a, thereby releasing the coin and permitting it to drop into any suitable receiver (not shown), and after further rotation returns to its first position substantially as indicated in Fig. 1.

The emergency or auxiliary means I have devised to permit free passage through the turnstile if desired irrespective of the position of the reversible control means is also indicated in Fig. 2. In the present turnstile device in order to retain the arm 7 in the passage-way in a horizontal position, there is provided a dog 79 similar to the dogs 38 and 38a, Fig. 7. Connected to the dog 79 is an arm 80 which is secured to the core 81 of the solenoid 82 so that the operation of the solenoid 82 will cause the recession of the dog to permit the passage arm indicated at 83 which extends into the passage-way 3 to drop and clear the passage-way. One end of the core 81 is connected to a cord 84 so that upon pulling of same the dog 79 may also be made to release the arm 83. This cord may terminate in an emergency brake glass box 85, Fig. 2, of the usual type and may be placed on one or both ends of the turnstile as indicated.

The coin operating mechanism of the turnstile is as follows when electrical connections are arranged for "fare-in" operation:

A coin must be deposited in the coin slot 8 which will establish a circuit from the battery 100 through wire 106, switch 107, wire 108 through the coin through the wire 109 to the solenoid 62 thereby withdrawing the bolt 60 beyond the periphery of the ratchet 47a. The bolt remains in this withdrawn position so long as a coin is between the contact 71 and 72a, but as the person turns the turnstile the coin is dropped as indicated in Fig. 6 through the engagement of the coin arm 71a in the recess 77a.

During the turning of the turnstile in the counterclockwise direction, the contact 33 is open, the contacts 46 and 46a are closed. Prior to the completion of the quadrant the contact 46a is open, the contact 46 remains closed thereby establishing the circuit from the battery 100 through the wires 101, 102, 103, contact 46, wires 104, contact 33, wire 105 to the solenoid 14, thereby resetting the arm and at the same time breaking the circuit to permit the head 45 to be raised out of the path of the inreaching projections 43 of the arms 7.

The operation is similar in either direction and such direction is controlled by the operator through a switch 107. In the position shown in Fig. 11, the apparatus is set for "fare out" and if desired to set for "fare in", the switch 107 is rotatably arranged so as to turn only in a clockwise direction and therefore the switch arm 107 must pass the wiping contact 110 to reach the "fare in" position. This wiping of the contact 110, wire 111 and energize the solenoid 58a and thereby cause the ratchet arm 52 to drop down and reverse the free and locked directions of the turnstile. The coin circuit for withdrawing the lock in the "fare in" position now must be made through battery 100, wire 106, wire 112, coin contact 8, wire 109 through the locking solenoid 62. This change from "fare out" to "fare in" makes the contacts of the slot 8a inoperable, there being no battery lead through the wire 108. Any means may be provided to retain the coin in the inoperable coin slot so that a person depositing one in error may retrieve it. This means is not shown.

In case of emergency where a sudden rush is made to the turnstile which would prevent the free turning of same due to the compactness of the persons in the passage-way, a second emergency means than that shown in Fig. 2 may be provided whereby the passage arm may be dropped by the operator which comprises an electrical circuit including a switch arm 113 adapted to engage contact 114 to thereby cause the current to flow from battery 100, through wire 101, through switch 113, wire 115 to the solenoid 82 thereby releasing the passage dog 79 permitting the passage arm 83 to drop in the slot 35 and leave the passage-way unobstructed. In order to raise the passage arm, the operator moves the switch 113, contact 6, thereby causing the current to flow from battery 100, wire 101, switch 113 through wire 105 and solenoid 14 which resets the passage arm. The head 54, of course, would remain in the down position until the operator releases the switch which returns midway between the contacts 114 and 116 as shown in Fig. 11. The means for return of the switch arm is not shown, it being of the usual well known type.

Figure 12:
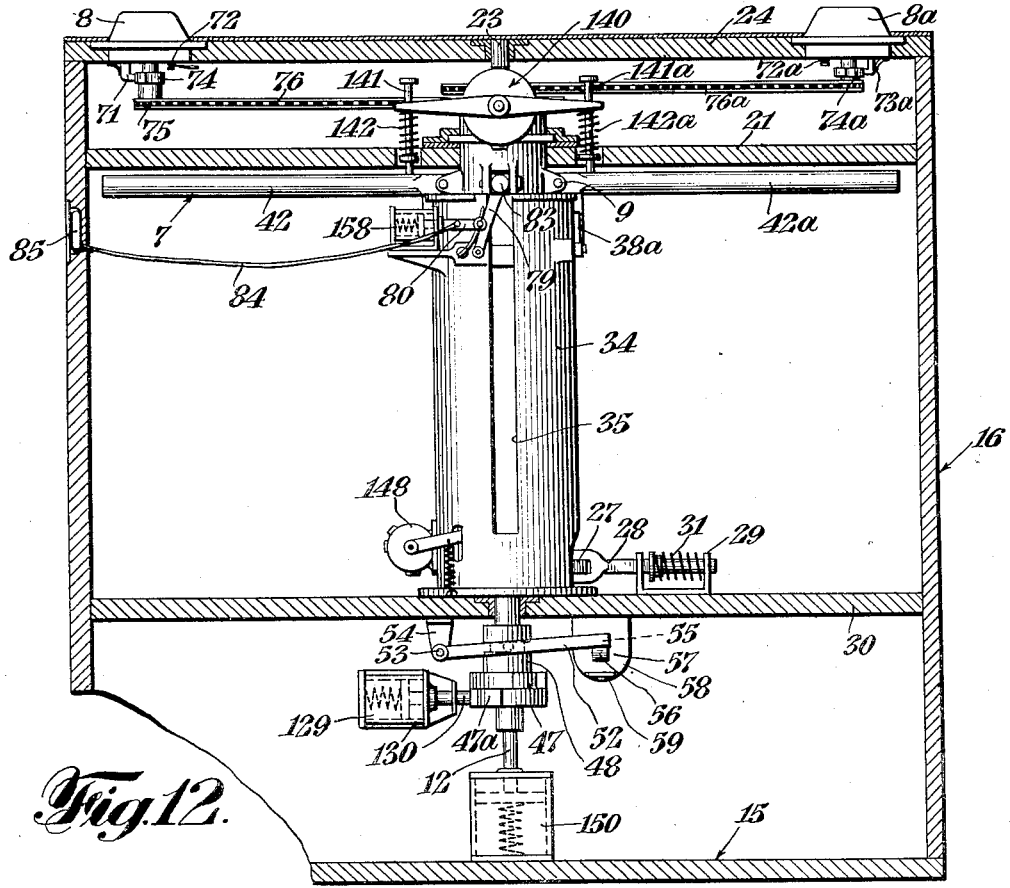
Fig. 12 is a view similar to Fig. 2 showing the turnstile operated by air mainly.
Figure 13:
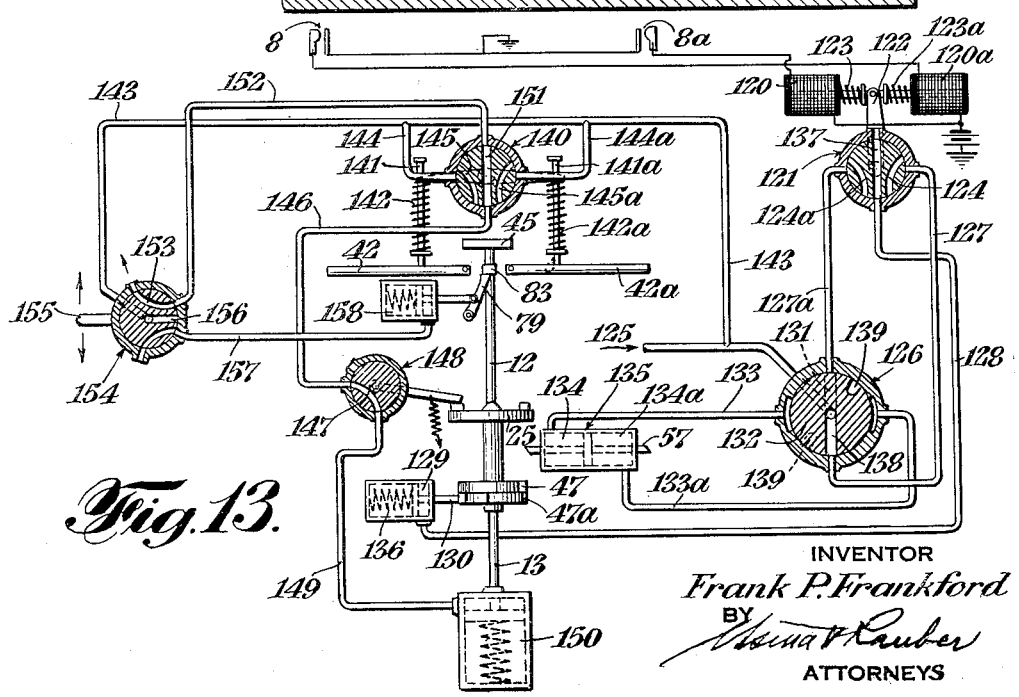
Fig. 13 is a diagrammatic illustration of the air circuit.
Figure 16:
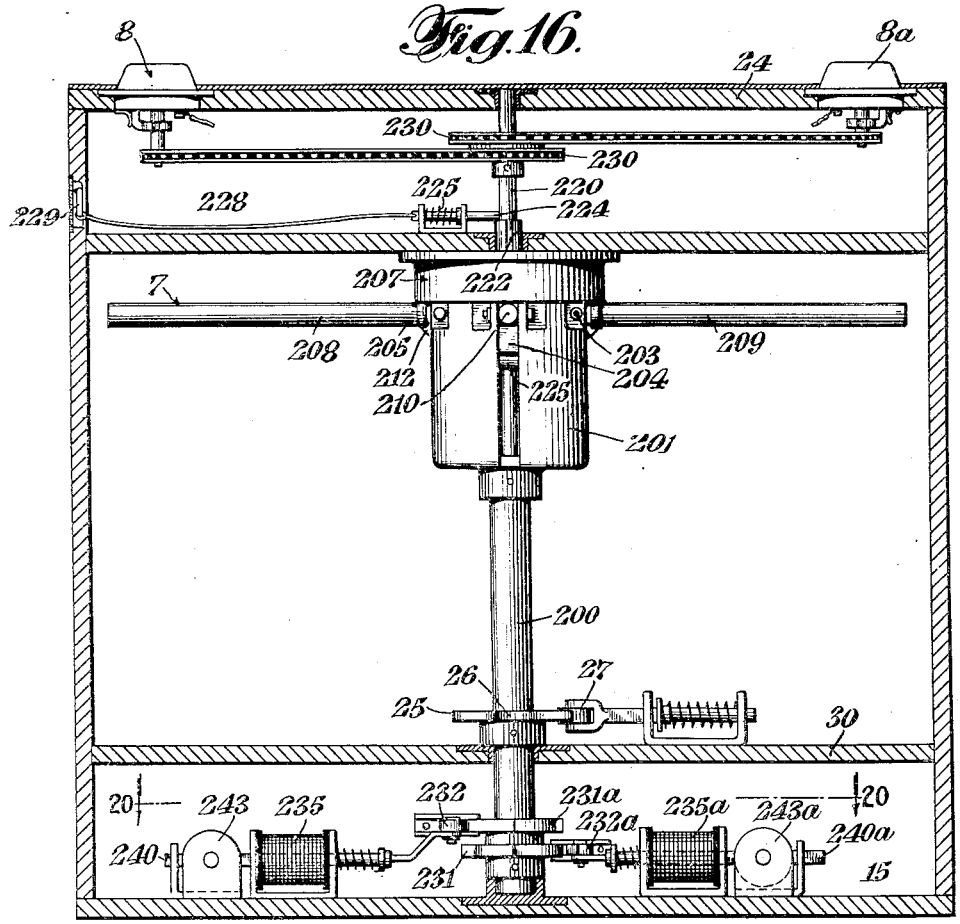
Fig. 16 is a view similar to Fig. 2 of another modification.

In the modification shown in Figs. 12 and 13, the turnstile is operated by means of compressed air except for the coin receiving mechanism which cannot be operated with as great sensitivity by compressed air. Therefore, electrical means is provided to operate an air valve.

This electrical means comprises the switches 8 and 8a for receiving the coin for "fare in" or "fare out" respectively, which operates the magnets 120 or 120a. The core of said magnets as shown in Fig. 13 is connected to a valve 121 through an arm 122 which is maintained in the central position by springs 123 and 123a.

If a coin is deposited in the coin slot at 8 the valve 121 will permit the compressed air to flow from the source 125 through a "fare in" and "fare out" valve 126, which will hereinafter be more fully described, through pipe 127, port 124 and pipe 128 which operates a piston through an air cylinder 129 causing the recession of a lock 130, thereby permitting the turnstile to be operated by the passenger. If a coin is deposited in the coin slot 8a the compressed air will flow from the source 125, through the valve 126, through the pipe 127a, (provided however the "fare in" and "fare out" valve is turned to the position indicated in dotted lines as at 131) through port 124a, pipe 128 which also causes the lock 130 to recede and permit the operation of the turnstile.

In turning the stem 132 of the valve 126 through 180° to the "fare in" position, the pressure is applied momentarily through the pipe 133 to act on a piston one side 134 of an air cylinder 135 which causes the stem 57 fixed to the piston to bring the ratchets 47 or 47a into cooperation with the lock 130 as previously described in the preferred embodiment which controls the "fare in" or "fare out" locking of the turnstile.

When the turnstile arms are in normal position, the compressed air is shut off at the valve 121 as indicated in its normal position as shown. The spring 136 in the cylinder 129 returns the lock into engagement with the ratchets 47 and 47a. The exhaust of the chamber 129 will be permitted through the pipe 128 and exhaust port 137. When the core of the valve 121 is turned in either direction, this exhaust port 137 is cut out and either of the ports 124 and 124a are caused to communicate with the pressure pipes 127 or 127a and pipe 128. When the "fare in" and "fare out" valve 126 is operated and the air is momentarily caused to flow through the pipes 133 or 133a (this valve is permitted to turn only in clockwise direction) one of the chambers 134 or 134a is connected to the pressure side through the port 138 and the other side on the opposite side of the piston is permitted to exhaust through the port 139. The port 139 is arranged to oppose the port 138 with respect to the pipes 133 and 133a.

Assuming that the valve stem 132 is turned from the position indicated in Fig. 13 to the dotted position indicated at 131, the exhaust port 139 communicates with the pipe 133a to permit exhaust of the chamber 134a the same time the pressure port 138 communicates with the pipe 133 which allows air into chamber 134 which moves the core 57 to the right. Vice versa, when the port 138 travels from the dotted position to the full line position in clockwise direction the chamber 134 is connected to the exhaust port 139 while the chamber 134a is connected to the pressure side, and the core 57 is moved to the left.

During the first movement of the turnstile after a coin is deposited, a valve 140 is operated which is controlled by spring pressed pins 141 and 141a which rest on the front and rear turnstile arms 42 and 42a, that is, the first movement of the turnstile permits both pins 141 and 141a to drop under the influence of springs 142 and 142a. No operation of the valve will result since both of these springs are balanced, but upon completion of the quarter turn of the turnstile, only one of these arms will remain up and thereby raise its respective pin. One pin alone will affect the valve and turn it in a direction to effect the operation of the plunger 13 with its associated head 45 as previously described. This is done through pipe 143 connected to the pressure line which permits the air to flow through the pipes 144 or 144a by way of ports 145 and 145a which permit the compressed air to enter the pipe 146, thence through a port 147 of a valve 148, through pipe 149 to the air cylinder 150. Air entering thus will operate the head 45 and raise either of the arms 42 or 42a, one of which is down depending upon the direction or rotation of the turnstile. When the raising of the arm 42 or 42a is completed, the valve 140 returns to its normal neutral position as indicated in Fig. 13 which permits the exhaust of the cylinder 150 through pipe 149, port 147, pipe 146, exhaust port 151, pipe 152, port 153 of an emergency valve 154.

When it is desired to drop the passage-way arm 83, a handle 155 of the valve 154 which is under control of the operator is raised, thereby bringing the pressure from pipe 143 through port 156 and causing it to communicate by pipe 157 to an air cylinder 158. This air cylinder is adapted to affect the emergency release dog 79, the function of which is as previously described. When it is desired to reset the arm 83 to close off the passageway, the handle 155 is moved downwardly to cause the pressure port 156 to communicate with the pipe 152 through the port 151 of the valve 140, through pipe 146 port 147 and valve 148, through pipe 149 to the air cylinder 150, thereby pulling the head 45 and raising the arm 83. This head 45 will remain down until the handle 155 is reset in its neutral position as shown. This vertical position of the handle 155 may be effected automatically by means not being shown.

In the modification shown in Figs. 14 and 15, mechanism is illustrated for operating the turnstile electrically, having means provided to permit passengers free passage through the turnstile in either direction by dropping the passage arm 83, there being no free movement through the turnstile except by depositing a coin in the proper slot or by the will of the operator of the bus. Referring to Fig. 15, when a coin is deposited in the coin slots 8 or 8a, current flows from battery 100 through wires 175 and 176 to operate the solenoid 62, thence through wire 177, contact 178, switch arm 179 of a switch 180, through wire 181, contacts at 8 or 8a, through "fare in" and "fare out" switch 107, which is similar to the switch described in the preferred form (except the means for changing directional ratchets is omitted, no such ratchets are necessary in this modification). A single locking disc 185 is fixed to the rotating parts of the turnstile. This lock disc 185 definitely locks both directional rotations of the turnstile.

When it is desired to drop the passage arm 83 to permit free passage in either direction or for emergency purpose, the switch arm 186 is moved down which causes the current to flow from battery 100, through wire 175, coil 82, wire 187 to contact 188, through switch arm 189, to ground 190; thereby operating the passage arm release dog 79 as heretofore described. When it is desired to reset the passage arm 83, the switch handle 186 is moved upwardly as indicated in Fig. 15 which causes the current to flow from battery 100, through wire 191, through solenoid 14, through wire 192, contact 193, switch arm 194 to the ground 190.

In this modification the normal position of the turnstile arms is two arms "up" and two arms "down". One of the arms "up" is always the passage arm, the other arm "up" in the normal position depends upon the direction or rotation of the turnstile. However, when a coin is deposited in the proper slots 8 or 8a, the current flows from battery 100 through solenoid 14, wires 192 and 195, contact 196, switch arm 197, wire 181 through coin contacts 8 or 8a, through the "fare in" or "fare out" switch 107 and ground; thereby operating the solenoid 14 which raises the front or rear arm 42 or 42a depending upon which of these arms is down. It will be seen, therefore, that three arms are "up" only momentarily, immediately after the coin is deposited, three arms remain up until the turnstile is turned and thereafter two arms remain "up" until the next coin is deposited.

In the modification shown in Figs. 16 to 21 the turnstile arms are held in the horizontal or "up" position by weights attached to their inner ends, said weights being sufficiently heavy to maintain the arms in the "up" or horizontal position. Three arms are maintained in the horizontal position, and one which is at the wall of the bus is kept vertical or "down" during the normal or idle position of the turnstile, at the period of rest.

Rotatably mounted between the cross bars 15 and 21 is a spindle 200 which has secured at its upper end a casting 201 slotted as at 202, to permit the turnstile arms 7 to hang vertical therein. The arms 7 are pivoted as at 203 to the member 201 and are provided with weights 204 extending inwardly of the pivots. Rollers 205 suitably secured to the arms 7 are adapted to ride the cam surface 206 of a barrel cam 207 secured to the underside of cross bar 21. The casting 202 is adapted to rotate freely within the barrel cam 207. The extent of the cam face 206 is arranged so it maintains the front arm 208, rear arm 209, passageway arm 210 horizontally, and the wall arm 211 vertically. Depending cam surface 212 extending toward the wall will cause either of the front or rear arms to drop down when the turnstile is turned in either direction. This cam surface 212 is abrupt to cause the arm to swing down fully to the vertical position when the turnstile is turned slightly, so that the arc inscribed by the extreme ends of the turnstile arms is greater in the downward direction than in the horizontal direction, which prevents the striking of the extremity of the arms against the wall of the vehicle.

Secured to the lower end of the rod 200 is a cam 25, similar to the cam 25 in the previous modifications having recesses 26 adapted to co-act with spring pressed roller 27 to cause the quarter turn of the turnstile to be completed and also serves as means to align the arms in quadrangular relationship successively with respect to the passageway. It will be seen, therefore, that upon slight rotation of the turnstile arm, one of the front or rear arms will drop down quickly so that upon further rotation only two arms remain up. Immediately prior to the completion of a quarter turn, the prior wall arm will raise horizontally due to the weight 204, so that in the normal position three arms are up and the wall arm down. The barrel cam 207 serves to lower one arm and permits the raising of the opposite arm after each quarter rotation in either direction.

Secured beneath the cross bar 21 are two depending arcuate segments 213, which lie between the passage-way arm 210 and the front and rear arms 208 and 209 respectively. The lower face 214 lies over the weight during the travel of the arms from the front or rear to the passage-way position. The lower face 214 and the face 206 of the barrel cam being on opposite sides of the pivot 203 contact the arms 208 and 209 on both sides of the pivots during their movement to the passageway position and thereby preventing accidental raising and the possible lowering of the trailing arm by the passenger. The space between the two segments 213 permits the lowering of the passage-way in case of emergency as will be hereinafter described.

Secured to the upper end of the rod 200 is a shaft 220 (note Nos. 216, 217, 218, 219 skipped) the upper end of which is held in a bushing 221 in the cross bar 24. A non-rotatable sleeve 222 is slidable vertically on the shaft 220. A spring 223 urges the sleeve 222 upwardly which is retained in position shown in Figs. 17 and 18 by a pin 224 which engages the upper edge of the sleeve. A spring 223 maintains the pin 224 inwardly and prevents the raising of the sleeve 222. Secured to the lower end of the sleeve 222 is a roller 225 adapted to engage the lower end of the weight 204 of the passageway arm. Key 226 of the member 213 extends into a slot 227 in the sleeve 222 and prevents rotation thereof. A cord 228 is secured to the end of the pin 224 which extends into an emergency break-glass box 229 in the end of the turnstile frame. It will be apparent that in case of emergency the pulling of the cord 228 will release the sleeve 222 which moves upward under the action of the spring 223. In so doing the roller 225 engages the weight 204 of the passage-way arm and swings it about its axis 203 to the vertical position, to clear the passage-way. The reset of the passage-way arm is effected by manually lifting the arm back to the horizontal position until the pin 224 snaps over the upper edge of the sleeve 222.

Secured to the upper end of the shaft 220 are the coin release sprockets 230 which release coins in the coin slots 8 and 8a as previously described. "Fare in" and "fare out" ratchets 231 and 231a are secured to the lower end of the rod 200. These ratchets are opposite in direction and are adapted to co-operate with their respective pawls 232 and 232a which are pivoted as at 233 and 233a in brackets 234 and 234a.

Solenoids 235 and 235a are adapted to operate cores 236 and 236a against the action of springs 237 and 237a, which normally urge the pawls against the ratchets through the links 238 and 238a, secured to the pawls as at 239 and 239a.

Extensions 240 and 240a of the cores are provided with openings 241 and 241a adapted to receive the lazy cores 242 and 242a of the solenoids 243 and 243a respectively. The solenoid 243 comprises a pair of coils 244 and 245, and solenoid 243a comprises a pair of coils 244a and 245a. The coils 244 and 244a, when energized will cause their respective cores to move towards the extension 240 and 240a, while the coils 245 and 245a pulls their respective core in the opposite direction. As will be more fully described hereinafter, the coils 244 and 244a are energized only when the openings 241 and 241a of the extensions are in alignment therewith for the purpose of locking the pawls 232 and 232a in their disengaged position.

Figure 21:
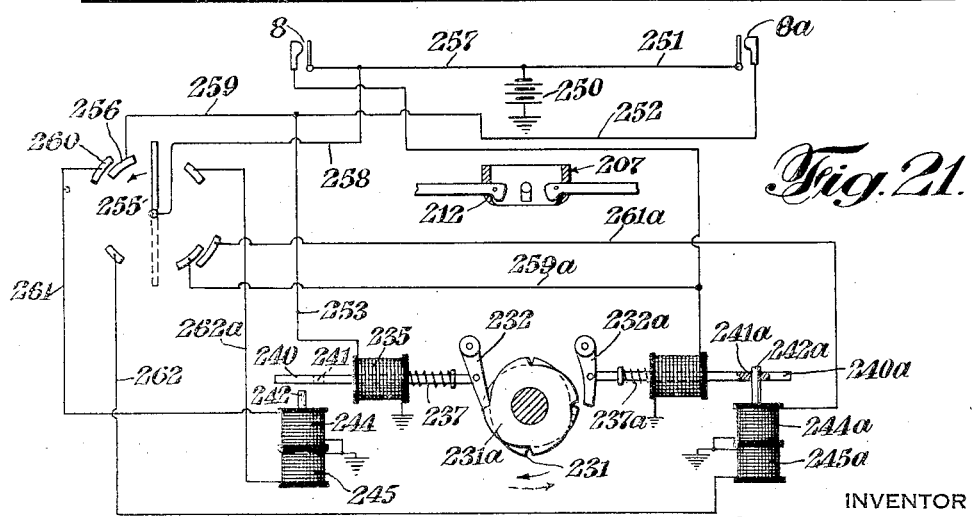
Fig. 21 is a schematic view of the modification shown in Figs. 18 to 20, and the electrical connections therefor shown diagrammatically.

In the operation of the device a coin deposited in the coin slot 8a, Fig. 21, (the turnstile is now set in the "fare out" position) causes the retraction of the pawl 232 to permit the turnstile to move in a counter-clockwise direction, the current being supplied from battery 250, wire 251, contacts at 8a, wires 252 and 253, through solenoid 235, thereby retracting the pawl 232. When the turnstile is set for the "fare out" position as shown the "fare in" pawl 232a is held out of engagement with its respective ratchet by the locking core 242a. A rotatable wiper arm 255 adapted to rotate in a counter-clockwise direction only is shown in the "fare out" position. When it is desired to change over to the "fare in" position, the wiper arm 255, during its movement, will first engage the contact 256 which causes the current to flow from battery 250 through lines 257, 258, contact 256, wires 259, 253, through solenoid 235 and thereby disengage the "fare out" pawl 232. Upon further movement of the arm 255, the current will also flow through contact 260 through wire 261 and coil 244, which causes the locking core 242 to engage in the openings 241 of the extension 240 and retain pawl 232 out of engagement with the ratchet against the action of its spring 237. Upon further rotation of the arm 255 in a counter-clockwise direction current is supplied by the wire 262 to the coil 245a, which retracts the lazy locking core 242a from the opening 241a in the extension 240a, and permits the spring 237a to urge the "fare in" pawl 232a into locking engagement with its respective ratchet, thereby placing the parts in a position ready for "fare in" operation.

Coins now deposited in the coin slots 8a will retract the pawl 232a to permit the passenger to operate the turnstile in the "fare in" direction, the pawl 232a remaining disengaged until the coin is dropped, whereafter the spring 237a will return the pawl 232a into locking position, as heretofore described.

In the normal operation of the turnstile it will be seen that only one pawl is effective at any time, that is when the wiper arm 255 is in the position shown the "fare out" pawl 232 is in engagement with the "fare out" ratchet, while the "fare in" pawl 232a is held out of effective engagement. After the wiper arm is rotated to the position indicated in dotted lines the "fare in" pawl 232a becomes the controlling pawl, while the "fare out" pawl 232 is locked out of engagement.

When it is desired to permit free passage in a "fare required" direction, the wiper arm is rotated slightly in a counter-clockwise direction no further than to cause the disengagement of the controlling pawl, which leaves both pawls out of engagement, thereby permitting free passage. The wiper is then returned clockwise to the previous position. The wiper is yieldable slightly in a clockwise direction, which is not shown in the drawings, it being well understood in the switch art.

Having broadly and specifically disclosed the present invention and having illustrated and described three modifications thereof, it is apparent that many adaptations of the same may be made without departing essentially from the nature and scope thereof as may be set forth in the following claims:

What I claim is:

1. In a turnstile including a rotatable head with quadrangularly disposed turnstile arms pivotally mounted thereon and means to maintain three of the arms in a horizontal position and the fourth arm in a vertically hanging position when the said head is in a rest position, reversible ratchet means to control the rotation of said head in one direction and to permit free rotation in the opposite direction, means to release the controlled ratchet to permit the head to rotate through a single quadrant in the controlled direction, means operating at the conclusion of a rotation of said head through a single quadrant in either direction to lift the vertically hanging arm to a horizontal position, and means operating at the initiation of said rotation in either direction to drop the horizontal arm next following the vertically hanging arm in the direction of rotation to a vertically hanging position.

2. In a turnstile of the type described and claimed in claim 1, toll operating means to control the release means of the said control ratchet.

3. In a turnstile of the type described and claimed in claim 1, toll operating means to control the release means of the said control ratchet and means to reverse the said ratchet means to obtain a toll controlled rotation of said head in the opposite direction.

4. In a turnstile of the type described and claimed in claim 1, emergency means to release the horizontal supporting means of the middle arm to thereby drop the same to a vertically hanging position and means to return said arm to a horizontal position when desired.

5. In a turnstile of the type described and claimed in claim 1, toll operated electrical means to operate said release means of the said control ratchet.

6. In a turnstile of the type described and claimed in claim 1, toll operated electrical means to operate said release means of the said control ratchet and switch operated electrical means to reverse the said ratchet means to obtain a toll controlled rotation of said head in the opposite direction.

7. In a turnstile of the type described and claimed in claim 1, reversible toll operated electrical means to operate said ratchet release means, and switch operated electrical means to reverse the said toll means and the said ratchet means to obtain a reverse operation of the said turnstile.

FRANK P. FRANKFORD.